Jan. 17, 1967  C. E. BURFORD  3,298,497
TRANSFER MECHANISM FOR CONVEYERS
Filed Dec. 21, 1964  4 Sheets-Sheet 1

INVENTOR
CHARLES E. BURFORD
BY Browne, Schuyler & Beveridge
ATTORNEYS

Jan. 17, 1967    C. E. BURFORD    3,298,497
TRANSFER MECHANISM FOR CONVEYERS
Filed Dec. 21, 1964    4 Sheets-Sheet 2
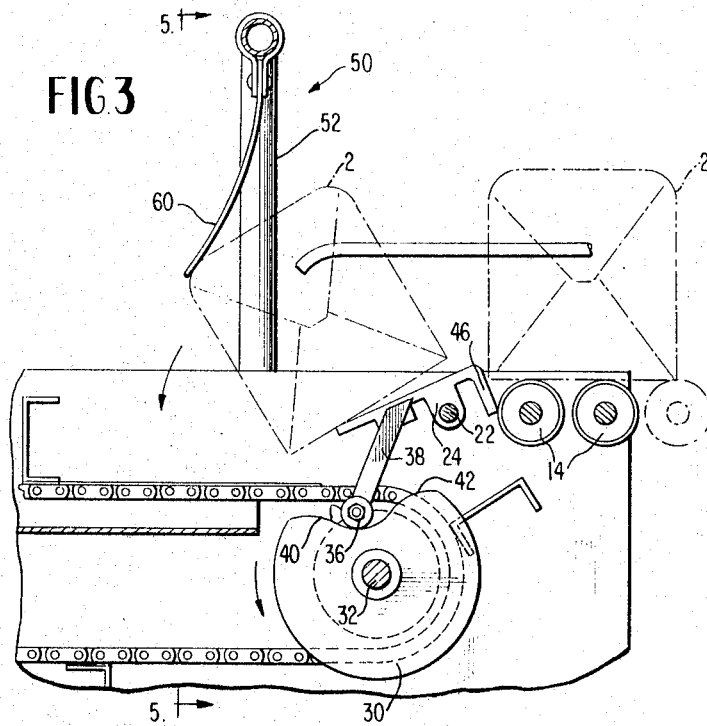
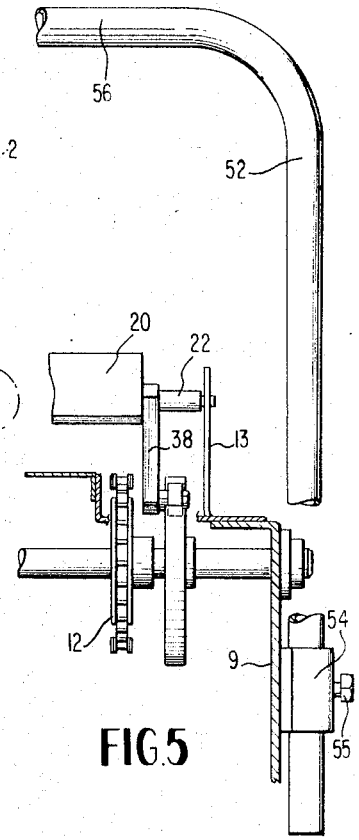
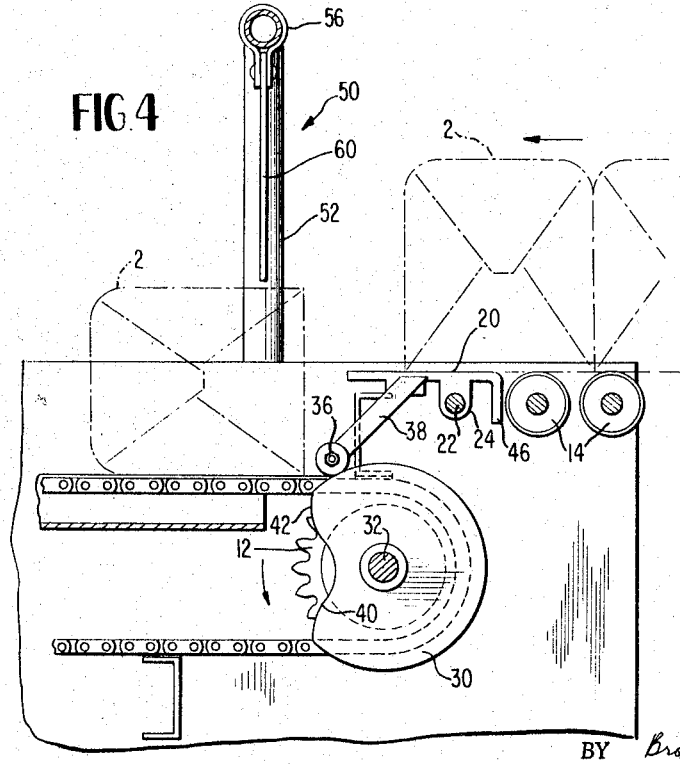
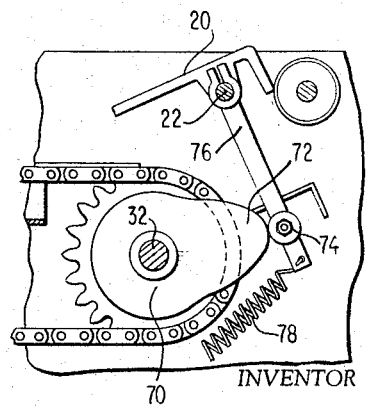
INVENTOR
CHARLES E. BURFORD
BY Browne, Schuyler & Beveridge
ATTORNEYS Jan. 17, 1967  C. E. BURFORD  3,298,497
TRANSFER MECHANISM FOR CONVEYERS
Filed Dec. 21, 1964  4 Sheets-Sheet 3

INVENTOR
CHARLES E. BURFORD
BY Browne, Schuyler & Beveridge
ATTORNEYS

Jan. 17, 1967  C. E. BURFORD  3,298,497
TRANSFER MECHANISM FOR CONVEYERS
Filed Dec. 21, 1964  4 Sheets-Sheet 4

INVENTOR
CHARLES E. BURFORD
BY Browne, Schuyler & Beveridge
ATTORNEYS

United States Patent Office 3,298,497
Patented Jan. 17, 1967

1

3,298,497
TRANSFER MECHANISM FOR CONVEYERS
Charles E. Burford, Maysville, Okla., assignor to The Burford Company, Maysville, Okla., a corporation of Oklahoma
Filed Dec. 21, 1964, Ser. No. 419,704
17 Claims. (Cl. 198—33)

This invention relates generally to article conveying, and more particularly, to a new and improved mechanism for transferring articles from one conveyor to another conveyor, for example, during the course of the packaging operation disclosed in U.S. Patent No. 3,138,904, assigned to the assignee of the present invention.

One of the objects of the present invention is to provide an improved transfer mechanism that will separate articles which are indiscriminately delievered on one conveyor, and subsequently transfer the separated articles to a forwardly situated second conveyor in a pre-determined position and regular sequence for subsequent processing of the articles.

A further object of the present invention is to provide such a transfer mechanism that will operate effectively and smoothly over sustained periods of use with minimum power requirements, and yet consists of a relatively minor number of parts which may be economically incorporated into new as well as existing conveyor systems without sacrificing performance.

Another object of the present invention is to provide such a transfer mechanism that is particularly suitable for use in the packaging of bread loaves in the manner disclosed in the above-identified patent, although not limited to this use. Included in this object is the provision of such a transfer mechanism which will receive the packaged bread loaf with the sides of the bread loaf extending vertically and will subsequently transfer the bread loaf to a forwardly situated conveyer with the bread loaf positioned on its side so as to facilitate the subsequent tying operation on the package enclosing the bread loaf.

The foregoing and other objects are achieved according to this invention by a mechanism located at the discharge end of a first conveyor (hereinafter referred to as the "delivery conveyor") which indiscriminately transports articles to the transfer mechanism for subsequent transfer to a second conveyor (hereinafter referred to as the "receiving conveyor") located at the discharge end of the transfer mechanism below the level of the delivery conveyor; the receiving conveyor serving to transport the articles in a pre-determined position to a station for further processing, such as the tying operation disclosed in the above-identified patent.

The transfer mechanism comprises a platform which pivots between a first horizontal position generally aligned with the delivery conveyor and a second position extending downwardly at an oblique angle from the delivery conveyor to the receiving conveyor. In the horizontal position, the platform receives the article from the delivery conveyor and in the tilted or pivoted position, the article slides by gravity downwardly across the platform and is deposited onto the receiving conveyor. The platform is mounted such that in its tilted position, the input edge of the platform is situated above the plane of the delivery conveyor so as to act as a stop to prevent subsequent articles from being disposed on the platform.

When the transfer mechanism is employed in the packaging of bread loaves as disclosed in the above-identified patent, a yieldable restraining device is suspended above and slightly in advance of the platform so as to engage and guide the bread loaf onto the receiving conveyor with the loaf positioned on its side as a result of 90° rotation of the loaf from its position on the platform.

2

Rotation of the bread loaf on its side while guided by the restraining device is accomplished by the output or delivery end of the platform which engages the bread loaf as the platform returns to its horizontal position to receive the succeeding bread loaf.

Actuation of the platform between its operative positions is achieved by means of a cam that is mounted for rotation by the drive mechanism associated with the receiving conveyor. Co-operating with this cam is a follower fixed with respect to the platform so as to be engageable by the cam. In a modified form of the platform actuating mechanism, movement of the platform to its tilted position is governed by the cam while return movement to the horizontal position is attained by a spring. In another embodiment of the invention, movement of the platform is substantially governed by the cam whereas in another embodiment of the invention return movement of the platform from its tilted position to its horizontal position is governed by the cam and the opposite movement to the tilted position is governed by a trip lever which is operable by a solenoid.

In order to ensure that the articles are transferred one-by-one to the receiving conveyor in regular intervals, movement of the platform is synchronized with movement of the receiving conveyor. In systems where the receiving conveyor has a plurality of longitudinally spaced conveyor flights or article positioning members, this synchronization is such as to cause the transfer mechanism to deposit an article between each pair of successive conveyer flights. In the embodiment which employs the trip lever for commencing movement of the platform to its tilted position, synchronization is obtained by periodic engagement of the conveyer flights with a switch that controls energization of the trip lever solenoid.

The foregoing and other objects of the present invention will be apparent from the following description taken in conjunction with the accompanying drawings in which:

FIG. 3 is a view similar to FIG. 2 but showing the transfer mechanism in a tilted position wherein the article is being discharged by the transfer mechanism onto the receiving conveyor;

FIG. 4 is a view similar to FIG. 2 but showing the return of the transfer mechanism to its horizontal position and the article finally deposited on its side on the receiving conveyer;

FIG. 5 is a fragmental cross-sectional view taken along lines 5—5 of FIG. 3;

FIG. 6 is a fragmental side view of an actuating mechanism for the transfer mechanism representing a modified form of the invention;

Figure 1:
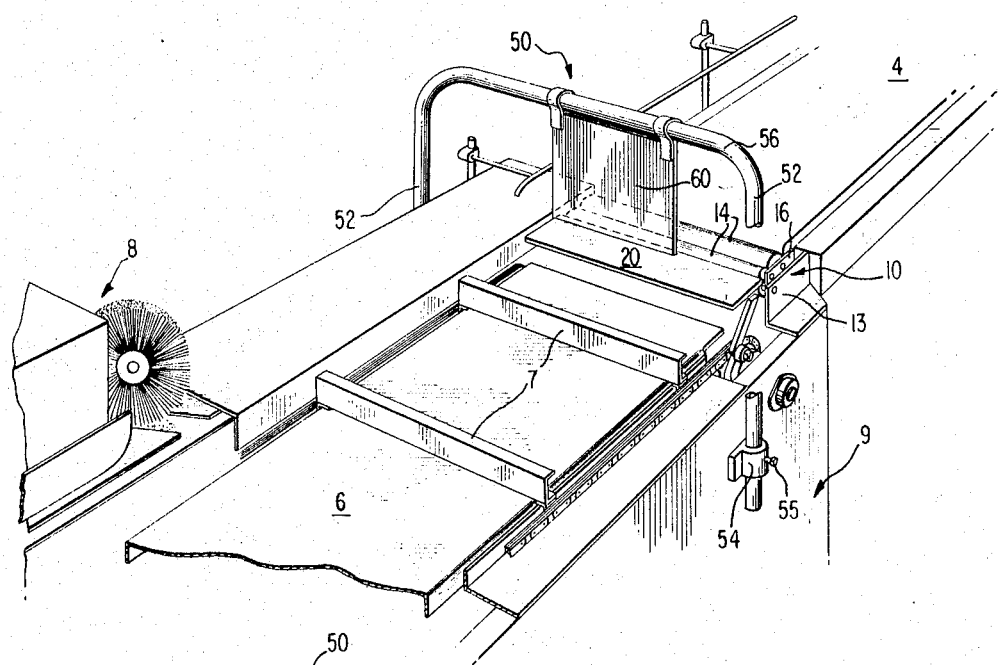
FIG. 1 is a fragmental perspective view of a conveying system incorporating the transfer mechanism of the present invention.

Referring to the drawings in detail, the present invention is shown for illustrative purposes only in conjunction with the packaging of bread loaves 2 as disclosed in the above identified patent wherein the loaves 2 are wrapped in a cellophane bag, for example, by a machine (not shown) which discharges the wrapped loaves 2 onto a delivery conveyer 4 for subsequent deposit on a receiving conveyer 6 which in turn carries the wrapped loaves to a tying station 8 where the open ends of the cellophane wrapper are tied closed.

A transfer mechanism, generally designated 10, embodying the present invention is employed to transfer the loaves from the discharge end of delivery conveyer 4 to a position between successive flights 7 of receiving conveyer 6, the input end of which is located below and in advance of the discharge end of delivery conveyer 4. In the shown embodiment, the delivery and receiving conveyers are of the endless belt type which are driven by chains and sprockets powered by a motor (only drive sprocket 12 of receiving conveyer 6 being shown); and the discharge end of delivery conveyer 4 is formed by a plurality of transverse idler rollers 14 suitably mounted for rotation in support plates 16. A more detailed description of the packaging and tying operation may be obtained by reference to the above-identified patent; however, it is to be understood that the present invention has utility in other operations and conveying systems.

Figure 2:
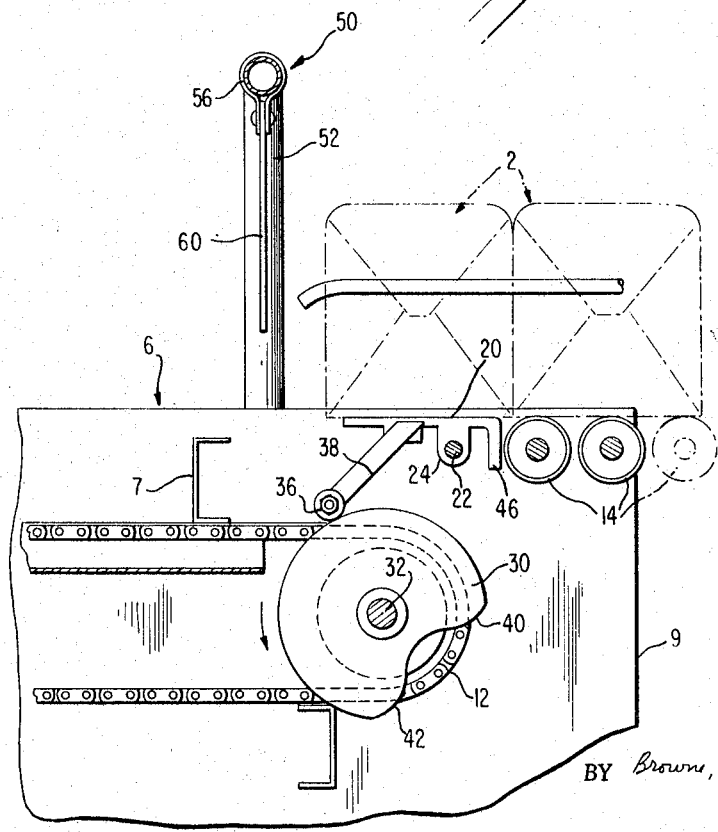
FIG. 2 is an enlarged fragmental side view of the system of FIG. 1 illustrating the position of an article (in phantom) on the transfer mechanism prior to transfer of the article to the receiving conveyer.

In the specific embodiment of FIGS. 1 to 6, transfer mechanism 10 includes a rectangular planar platform 20 situated in advance of idler rollers 14 and above the input end of receiving conveyer 6 as best shown in FIGS. 2, 3 and 4. Platform 20 is mounted for pivotal movement between a horizontal position aligned with the top of idler roller 14 (as shown in FIG. 2) and thus forming a continuation of the conveying path from delivery conveyer 4 and a second oblique or tilted position extending downwardly from idler rollers 14 towards the receiving conveyer as shown in FIG. 3. Mounting platform 20 for movement in this manner is a transverse pivot shaft 22 rotatably received through a pair of mounting lugs 24 depending from the platform and journalled in L-shaped brackets 13 fixed to support structure 9 on opposite sides of receiving conveyer 6. Pivot shaft 22 is offset towards the input end of the platform so as to permit the platform to pivot under its own weight into its tilted position as will now be described in greater detail.

Actuation of platform 20 between its operating positions in synchronism with receiving conveyer 6 is governed by a cam 30 mounted for rotation on the sprocket shaft 32 of the receiving conveyer so as to be rotatable thereby. Co-operable with the periphery of cam 30 is a follower shown as a roller 36 mounted to the lower end of an arm 38 which depends obliquely from the underside of platform 20. When cam follower 36 engages the circular portion of the cam periphery as shown in FIGS. 2 and 4, the platform will be held in horizontal position against counter-clockwise movement (as viewed in FIGS. 2 and 4). Movement of the platform to its tilted position, is obtained by a recess in cam 30 defined by peripheral cam portion 40 while return movement of the platform to horizontal position from tilted position is accomplished by the peripheral cam surface 42. In this manner, the operation of platform 20 is synchronized so that an article will be deposited between successive flights 7 of receiving conveyer 6. Additionally, movement of the platform 20 as governed by cam 30 is such as to ensure that the flights 7 will pass under platform 20 when the latter is in horizontal position as in FIG. 4 to avoid obstruction.

In the embodiment of FIGS. 1–5, movement of the platform to its tilted position is limited by providing the input end of the platform with a depending flange 46 spaced from the end idler roller 14 so as to permit movement of the platform to its tilted position from the horizontal position but to engage the same as shown in FIG. 3.

When the transfer mechanism is employed such as in the illustrated embodiment in connection with the afore-decribed packaging of bread loaves, its positioning and actuation are designed so that as the platform returns to its horizontal position from its tilted position, the discharge end of the platform will engage the underside of the bread loaf to rotate the loaf about its longitudinal axis to deposit the loaf on its side on the receiving conveyer.

In order to guide and control the movement of the article off the platform to ensure that the loaf is deposited on its side on the receiving conveyer, there is provided a yieldable restraining device generally designated 50. In the embodiment of FIGS. 1 to 5 this device includes a U shaped supporting frame whose legs 52 are fixed in tubular brackets 54 mounted to the supporting structure 9 on opposite sides of the receiving conveyer so as to locate the cross piece 56 of the frame above and slightly in advance of platform 20. A flexible flap 60 is suitably secured at its upper end to the frame cross piece 56 to dispose the opposite free end of the flap in the path of movement of the loaf as the loaf slides off the platform as illustrated in FIG. 2. The vertical position of flap member 60 may be adjusted by loosening the set screws 55 in brackets 54 and sliding the legs of the support member to the desired position.

Operation of the transfer mechanism will be apparent from the above description taken in conjunction with the following explanation. Assuming that both the delivery and receiving conveyers are operating, and starting with the position of the mechanism as shown in FIG. 2, wherein the leading article 2 has been advanced onto platform 20 which is in its horizontal position as governed by cam 30, continued rotation of cam 30 will position the cam recess 40 below cam follower 36 and the platform will pivot into its tilted position as shown in FIG. 3. In this tilted position, the next succeeding article is prevented from moving onto the platform by the input end of platform 20 which is located above the top of idler rollers 14. While in this tilted position, the leading article 2 will slide downwardly off the platform into engagement with flap 60 which will retard movement of the article so as not to allow it to tumble out of control onto the receiving conveyer.

As cam 30 continues to rotate and the follower registers with cam surface 42, the platform will be pivoted in a clockwise direction (as viewed in the drawings) back towards its horizontal position. During this movement of the platform, the leading or discharge end of the platform will engage the underside of the loaf 2 to cause the loaf to rotate about its longitudinal axis transverse to the conveyer movement while guided by flap 60 whereupon the bread loaf will ultimately be rotated 90° and deposited on its side on the receiving conveyer as shown in FIG. 4. As the cam continues to rotate, the above transfer will be repeated.

In FIG. 6, a modification of the embodiment illustrated in FIGS. 1–5 is shown wherein the actuating mechanism includes a jumping cam 70 mounted on the sprocket drive shaft 32 to be driven thereby in synchronism with the receiving conveyer. Cam 70 is provided with a projecting portion 72 engageable with a follower 74 mounted on the lower end portion of an arm 76 that vertically depends from platform 20 below the pivot shaft 22 thereof. Cam portion 72 is dimensioned so it will engage roller 74 to pivot the platform to its horizontal position from its tilted position.

However, in this modification of FIG. 6, there is provided a tension spring 78 anchored at one end and connected to the free end of follower arm 76 at its other end to bias follower arm 76 clockwise (as viewed in FIG. 6) and consequently platform 20 into horizontal position. Thus, after follower 74 reaches the high point of cam portion 72, spring 78 will initiate return of platform 20 to its horizontal position.

Figure 7:
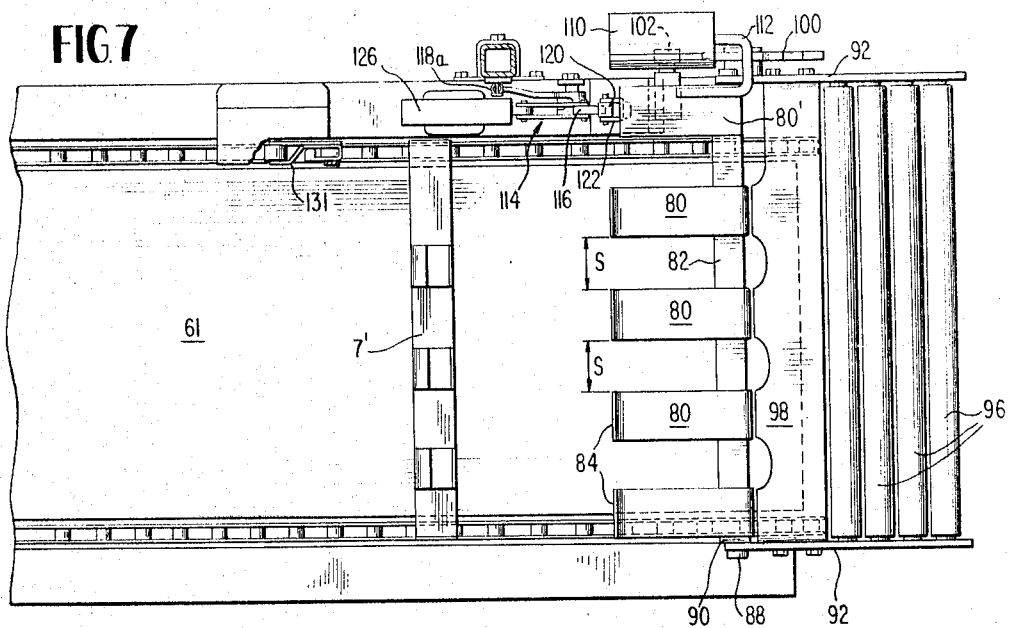
FIG. 7 is a fragmental plan view of a conveying system incorporating another embodiment of the transfer mechanism.
Figure 8:
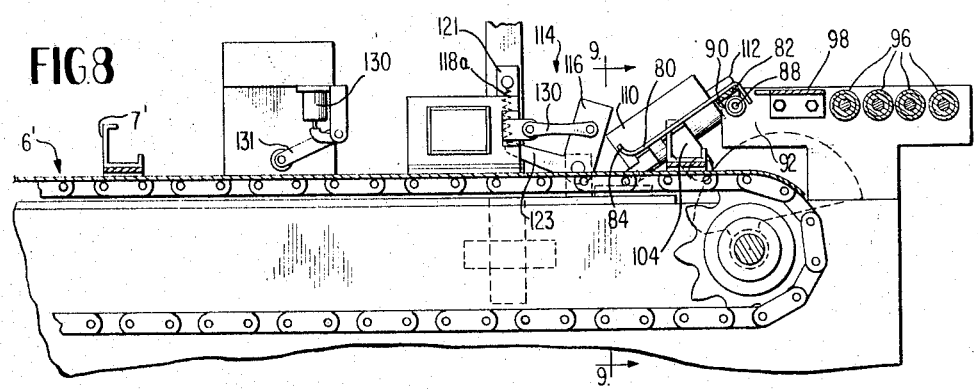
FIG. 8 is a side view of the system of FIG. 7.

In FIGS. 7 through 10 inclusive, there is illustrated a preferred embodiment of the transfer mechanism wherein the platform is comprised of a plurality of laterally spaced coplanar fingers 80 extending in the direction of conveyer movement with each finger fixed at one end to a cross-piece 82 and having the other end 84 curved upwardly as shown in FIG. 8. Platform fingers 80 are made from rigid material such as steel, sufficiently strong to support articles to be transferred, and the spacing S (see FIG. 7) between fingers 80 is large enough to permit flights 7' of receiving conveyer 6' to pass therebetween without obstruction.

Platform 80 is mounted for pivotal movement between its horizontal and tilted positions by a shaft 88 which is received through downturned ends 90 of platform cross-piece 82 and suitably journalled for rotation in support plates 92 situated on opposite sides of platform 80 between receiving conveyer 61 and the delivery conveyer, not shown. Plates 92 also rotatably support idler rollers 96, and in the preferred embodiment a stationary platform 98 is bolted at its opposite ends to plates 92 to lie between idler rollers 96 and platform 80 as shown in FIGS. 7 and 8.

Figure 9:
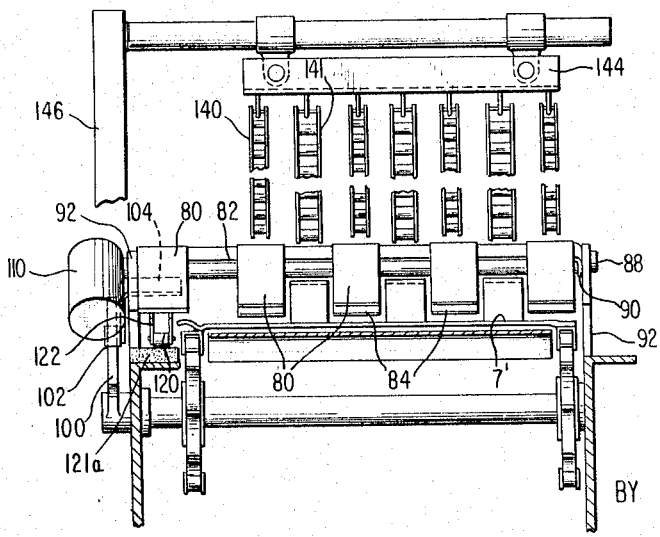
FIG. 9 is a fragmental cross-section view taken generally along lines 9—9 of FIG. 8.

Actuation of platform 80 to its horizontal position is obtained by a C-shaped cam 100 rotatably mounted on conveyer drive shaft 32' so as to be co-operable with a follower shown as a roller 102 mounted on an L-shaped bracket 104 which depends from outer finger 80' of the platform as shown in FIG. 9.

Movement of platform 80 to its tilted position is obtained by a counter-weight 110 suitably secured to platform 80 such as by U-shaped bar 112, whereby counter-weight 110 extends along finger 80' to cause counterclockwise movement (as viewed in FIG. 8) of platform 80 to tilted position when cam follower 102 is disengaged from cam 100 and a trip mechanism generally designated 114, now to be described, is released.

Figure 10:
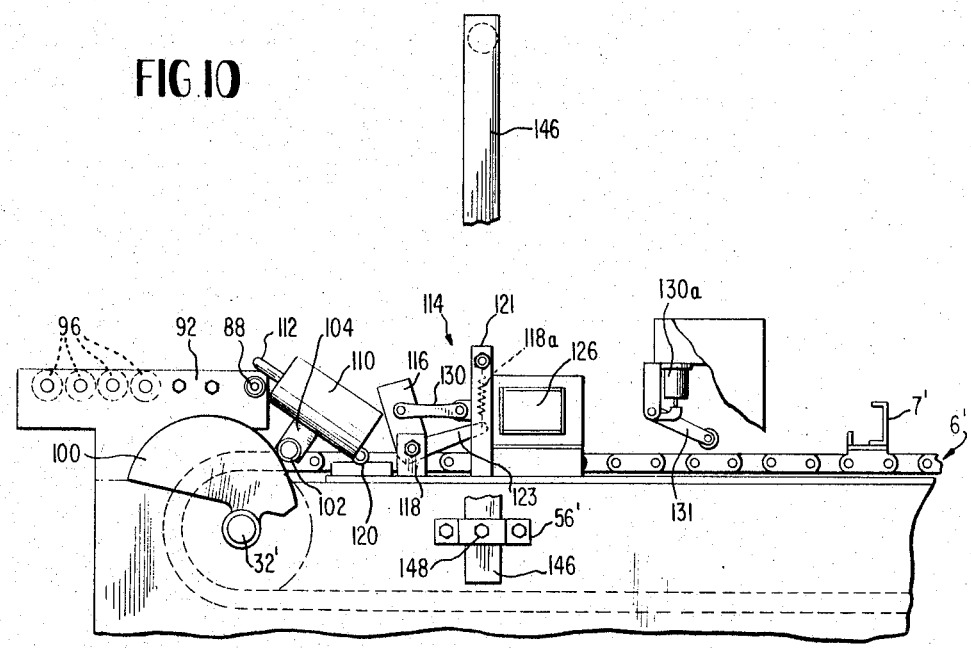
FIG. 10 is a view similar to FIG. 8 but taken from the opposite side of the system.
Figure 11:
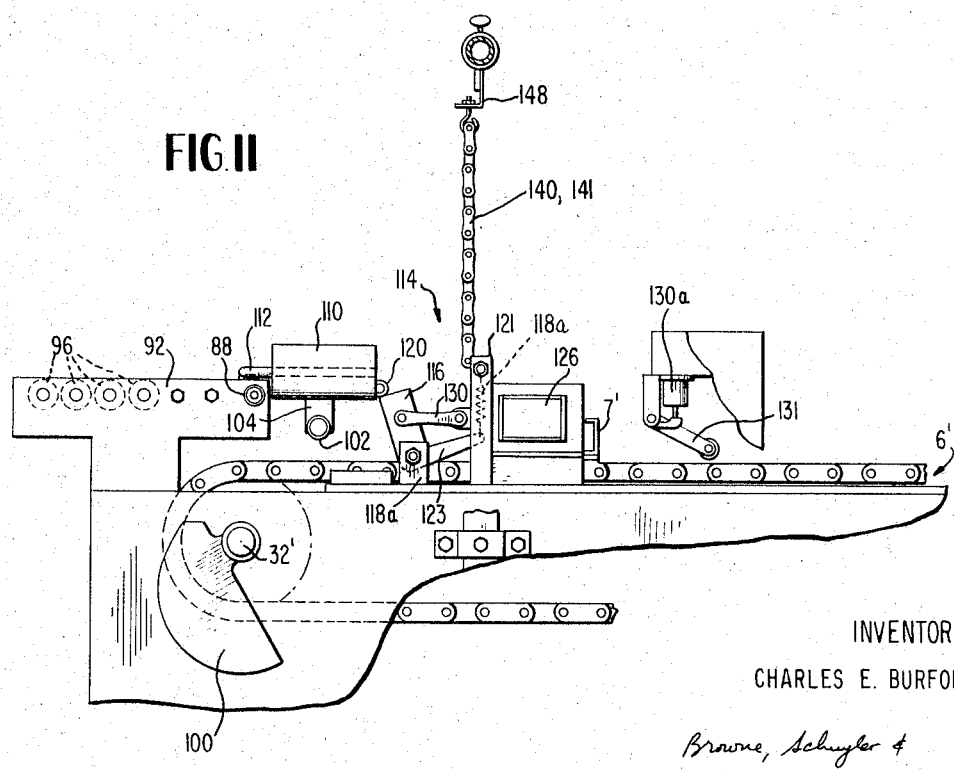
FIG. 11 is a view similar to FIG. 10 but with the transfer mechanism in a different position.

Trip mechanism 114 includes a lever 116 pivotally mounted at its lower end to a bracket 118 fixed to supporting structure on one side of receiving conveyer 6' as best shown in FIGS. 10 and 11. Trip lever 116 pivotable between an extended position shown in FIG. 11 wherein its upper end engages a second roller 120 mounted to an arm 122 fixed to the underside of platform finger 80' to thereby maintain platform 80 in the horizontal position; and a retracted position spaced from roller 120 permitting platform 80 to pivot to tilted position under the influence of counter-weight 110. Biasing trip lever 116 to its extended position is a tension spring 118a having one end anchored to a post 121 and the opposite end secured to an arm 123 which is fixed to trip lever 116 and projects therefrom generally at right angles.

Retraction of trip lever 116 to release platform 80 is obtained in the preferred embodiment by means of a solenoid 126 whose armature is connected to lever 116 by means of a link 130 to thereby cause clockwise rotation (as viewed in FIGS. 10 and 11) of lever 116 against the bias of spring 118 upon energization of the solenoid 126. Energization of solenoid 126 to retract lever 116 to release platform 80 is provided by a suitable switch 130a positioned at one side of receiving conveyer 6' to be operable intermittently by conveyer flights 7' upon engagement with an actuating lever 131. In this manner, actuation of the platform 80 and thus transfer of the articles may be synchronized with movement of receiving conveyer 6' to provide deposit of articles between successive conveyor flights 7' or differently as desired.

In order to cushion the impact of the platform upon pivoting into its tilted position, a bumper 121a formed of suitable resilient material is fixed on the side support structure of receiving conveyer 6' to engage roller 120 as best shown in FIG. 9.

Referring to FIGS. 9 and 11, in the preferred embodiment the restraining device for guiding articles during transfer is provided by a plurality of chains 140, 141 of pre-determined weight suspended at their upper ends from a hanger 144 with their lower ends free to engage and control the deposit of articles such as bread loaves in the manner described above in connection with the embodiment in FIGS. 1 to 5. Chain hanger 144 is in turn suspended from a pair of spaced tubular brackets 146 which are adjustably mounted on cross-piece 56' by means of a set screw 148.

As will be apparent to persons skilled in the art, various modifications and adaptations of the structure above described will become readily apparent without departure from the spirit and scope of the invention which is defined in the appended claims.

What is claimed is:

1. In conveying apparatus including a first delivery conveyer having a discharge end and a second receiving conveyer situated below and forwardly of the discharge end of the delivery conveyer; a transfer mechanism for transferring articles from the delivery conveyor to the receiving conveyer including a platform located between said conveyers, means mounting said platform for pivotal movement about an axis transverse with respect to movement of said conveyers between a horizontal position aligned with the discharge end of the delivery conveyer and a tilted position extending downwardly from the delivery conveyer to the receiving conveyer, and means for actuating said platform between said positions and yieldable restraining means engageable with articles as they are transferred from the platform to the receiving conveyer for guiding the articles into position on the receiving conveyer.

2. In conveying apparatus including a first delivery conveyer having a discharge end and a second receiving conveyer situated below and forwardly of the discharge end of the delivery conveyer; a transfer mechanism for transferring articles from the delivery conveyer to the receiving conveyer including a platform located between said conveyers, means mounting said platform for pivotal movement about an axis transverse with respect to movement of said conveyers between a horizontal position aligned with the discharge end of the delivery conveyer and a tilted position extending downwardly from the delivery conveyer to the receiving conveyer, means for actuating said platform between said positions, said platform having a forward edge adjacent said receiving conveyer engageable with the underside of the article as the platform moves to said horizontal position from said tilted position to rotate said article about an axis transverse to the receiving conveyer.

3. In conveying apparatus including a first delivery conveyer having a discharge end and a second receiving conveyer situated below and forwardly of the discharge end of the delivery conveyer; a transfer mechanism for transferring articles from the delivery conveyer to the receiving conveyer including a platform located between said conveyers, means mounting said platform for pivotal movement about an axis transverse with respect to movement of said conveyers between a horizontal position aligned with the discharge end of the delivery conveyer and a tilted position extending downwardly from the delivery conveyer to the receiving conveyer, means for actuating said platform between said positions, said platform having a forward edge adjacent said receiving conveyer engageable with the underside of the article as the platform moves to said horizontal position from said tilted position to rotate said article about an axis transverse to the receiving conveyer, and a yieldable restraining means provided above and in advance of said platform to be engageable with articles as they are transferred from the platform to the receiving conveyer and as they are engaged by said forward edge of the platform for guiding the articles into position on the receiving conveyer.

4. Conveying apparatus comprising a first delivery conveyer, a second receiving conveyer situated in advance and below the discharge end of said delivery conveyer, a transfer mechanism positioned between said conveyers for transferring articles from said delivery conveyer to said receiving conveyer, said transfer mechanism including a generally planar platform movable between a first horizontal position in alignment with the discharge end of said delivery conveyer and a tilted position extending downwardly from said delivery conveyer to said receiving conveyer, and a restraining device for guiding articles as they move across said platform to the receiving conveyer including a support having a portion situated in advance of said platform and over said receiving conveyer, and yieldable means having one end fixed to said support portion and an opposite free end engageable with articles to guide the same.

5. Apparatus as defined in claim 4 wherein said yieldable means includes a flexible flap member.

6. Apparatus as defined in claim 4 wherein said yieldable means includes a plurality of chains.

7. Conveying apparatus including a first delivery conveyer, a second receiving conveyer positioned forwardly of and below the discharge end of said delivery conveyer, said receiving conveyer having a plurality of longitudinally spaced flights for positioning articles therebetween on said receiving conveyer, and a transfer mechanism located between said conveyers and above the input end of said receiving conveyer for transferring articles from said delivery conveyer to said receiving conveyer, said transfer mechanism including a platform and means mounting said platform for pivotal movement between a first position generally aligned with the discharge end of said delivery conveyer and a second position extending downwardly from said delivery conveyer to said receiving conveyer for depositing articles on said receiving conveyer, said platform having apertures dimensioned to permit said conveyer flights to pass by said platform without obstruction, and means for actuating said platform between its positions.

8. Apparatus as defined in claim 7 wherein said means for actuating the platform between its positions includes a rotatable cam and a cam follower fixed with respect to the platform and engageable with said cam to move the platform from said tilted position to said horizontal position thereof, and a retractable lever engageable with the platform to hold said platform in said horizontal position thereof and being retractable away from said platform to permit said platform to move into said tilted position thereof.

9. Apparatus as defined in claim 8 further including a solenoid for retracting said lever, a switch for energizing the solenoid positioned at a point along said receiving conveyer and periodically engageable by flights of said receiving conveyer to energize the solenoid to retract the lever for pivoting said platform into the tilted position thereof in synchronism with movement of said receiving conveyer.

10. In conveying apparatus including a delivery means having a discharge end and a conveyer situated below and forwardly of the discharge end of the delivery means; a transfer mechanism for transferring articles from the delivery means to the conveyer including a platform located between the delivery means and the conveyer, means mounting said platform for pivotal movement between a generally horizontal position in which it receives articles from the delivery means and a tilted position extending downwardly from the delivery means to the conveyer, means for actuating said platform between said positions, and yieldable restraining means engageable with articles as they are transferred from the platform to the conveyer for guiding the articles into position on the conveyer.

11. The apparatus defined in claim 10 wherein said platform has a forward edge adjacent said conveyer extending upwardly from the platform to be engageable with the underside of the article as the article is transferred to the conveyer to rotate the article about an axis transverse to the direction of the movement of the conveyer.

12. The apparatus defined in claim 10 wherein said actuating means includes a rotatable cam, a cam follower fixed with respect to the platform and engageable with said cam to move the platform from said tilted position to the horizontal position, and a retractable lever engageable with the platform to hold the platform in its horizontal position, said lever being retractable away from the platform to permit the platform to move into said tilted position thereof.

13. The apparatus defined in claim 10 wherein said restraining means includes a plurality of freely hanging chains.

14. In conveying apparatus including a delivery means having a discharge end and a conveyer situated below and forwardly of the discharge end of the delivery means, a transfer mechanism for transferring articles from the delivery means to the conveyer including a platform located between the delivery means and the conveyer, means mounting the platform for pivotal movement between a generally horizontal position in which it receives articles from the delivery means and a tilted position extending downwardly from the delivery means towards the conveyer for discharging articles on the conveyer, and means for actuating the platform between said positions including a rotatable cam, a cam follower fixed with respect to the platform and engageable with said cam to move the platform from said tilted position to said horizontal position, and a retractable member engageable with the platform to maintain the platform in said horizontal position thereof and being retractable away from the platform to permit the platform to move into said tilted position thereof.

15. Apparatus as defined in claim 12 further comprising means for driving said receiving conveyer including a shaft and wherein said cam is mounted for rotation on said shaft.

16. The apparatus defined in claim 14 further including in combination means for moving the retractable member to its retracted position including a switch positioned along the conveyer so as to be engageable by flights on the conveyer to energize the switch to retract the member for moving the platform into the tilted position.

17. The apparatus defined in claim 16 wherein said platform is apertured in the direction of movement of the conveyer to permit flights on the conveyer to pass the platform without obstruction.

References Cited by the Examiner

UNITED STATES PATENTS

| | | | |
|---|---|---|---|
| 1,467,409 | 9/1923 | Wilkinson. | |
| 1,957,321 | 5/1934 | Criner | 198—26 |
| 2,430,605 | 11/1947 | Francona | 198—26 |

EVON C. BLUNK, *Primary Examiner.*

EDWARD A. SROKA, *Examiner.*